C. F. KELLER.
Combined Planter and Cultivator.
No. 168,750. Patented Oct. 11, 1875.
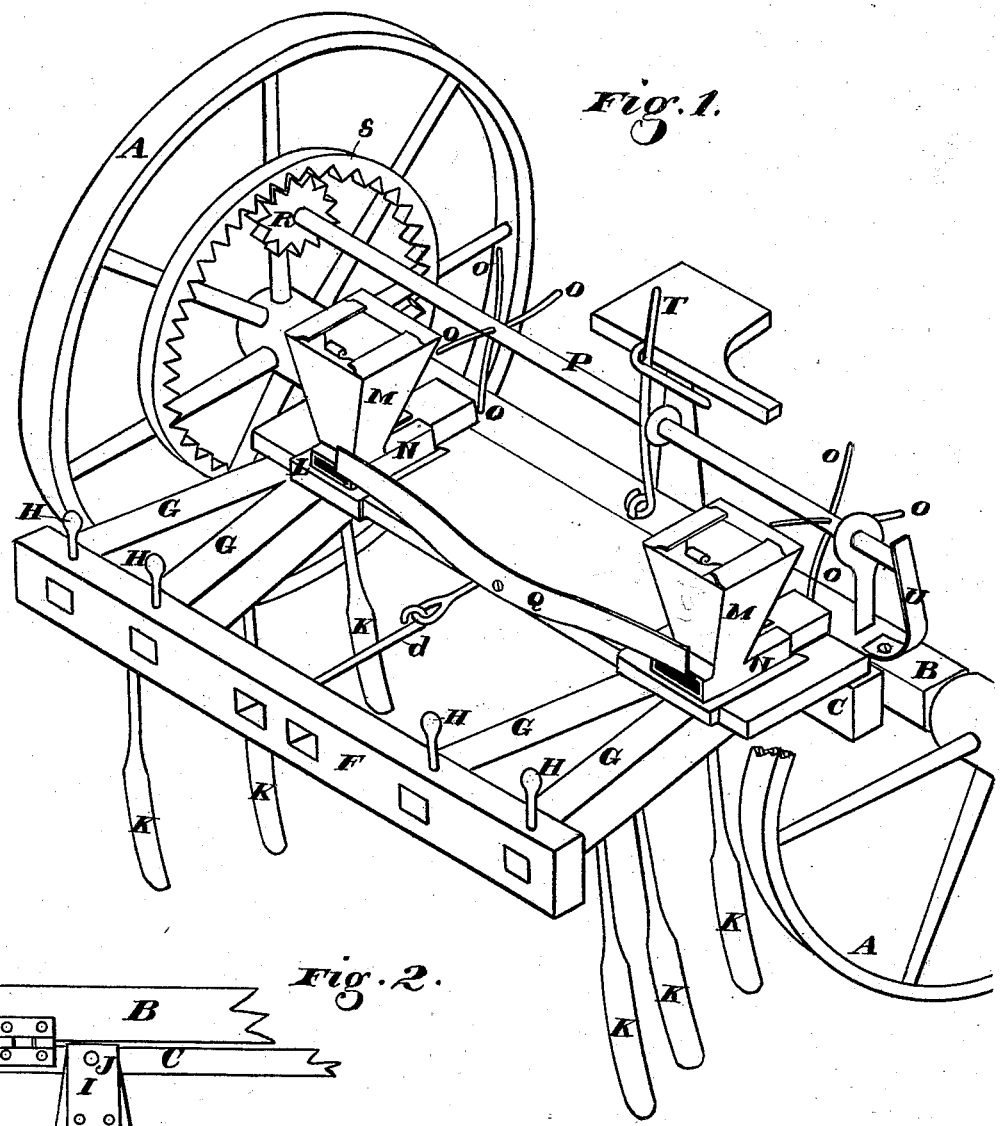

UNITED STATES PATENT OFFICE.

CHARLES F. KELLER, OF HEALDSBURG, CALIFORNIA.

IMPROVEMENT IN COMBINED PLANTERS AND CULTIVATORS.

Specification forming part of Letters Patent No. 168,750, dated October 11, 1875; application filed July 23, 1875.

*To all whom it may concern:*

Be it known that I, CHARLES F. KELLER, of Healdsburg, Sonoma county, State of California, have invented a Seed-Sower and Cultivator; and I do hereby declare the following description and accompanying drawings are sufficient to enable any person skilled in the art or science to which it most nearly appertains to make and use my said invention without further invention or experiment.

My invention relates to certain improvements in cultivators and seed-sowers; and it consists in a novel method of making the cultivator adjustable, so as to be used simply as a cultivator, or so that it will form the drills and cover the seed when used with the seed-sowing mechanism. It also consists in a novel mechanism for dropping the seed, by the use of which I am enabled to regulate the spaces minutely, and sow or plant at any distance apart.

Referring to the accompanying drawings for a more complete explanation of my invention, Figure 1 is a perspective view of my machine. Fig. 2 are detached sections of parts of the machine.

A A are the bearing-wheels, mounted upon the axle B. Behind this axle is hinged a beam, C, which carries the adjustable cultivator-frame, and, by reason of being hinged, it can, when released, be turned up, so that the teeth will not touch the ground. It is ordinarily held in place, however, by a link and hook, *d*, which attaches to a staple, *e*, beneath the axle. The adjustable frame consists of a bar, F, parallel with the beam C, with which it is connected by the beams G. The bar F is mortised to receive the forked ends of the beams G, and the tenons are held to their places by means of pins H. Straps I are secured to the front ends of the beams G, and extend around the beam C, being held to their position by pins J.

These straps can slide upon the beam C when the pins are removed, and when the beams G are released from the mortises in the rear bar, they may be moved near together or wider apart, as the machine is to be used. Other mortises in the bar F allow it to be fitted to the beams G, and pinned in either direction.

The teeth K project downward from the beams G in such positions that when sowing or planting, the forward teeth will form the drill, while the rear ones will cover the seed. When employed as a cultivator, however, the beams G and the teeth stand much nearer together, so as to pass between the rows. The seed sowing or planting device consists of a plate, L, which may be secured upon the adjustable frame by a single bolt, so as to be easily removed when desired. At each end of this plate are secured the seed-hoppers M, with their slides N, for dropping the seed. These slides are moved back by arms O, which radiate from a shaft, P, extending across just in front of the seed-hoppers, and when releasd from these arms the slides are returned to their original positions by a suitable spring, Q.

It will be readily seen that the movements of the slides will depend upon the number of the arms O. These latter can be increased or diminished at will, so as to sow the seed closely or far apart.

The shaft P has a pinion, R, at its end, and this is driven by the gear-wheel S, which is secured to one of the wheels A. The shaft P has considerable end play in its boxes, and may be moved by a lever, T, so as to throw the pinion R out of gear, and stop the sower at any time. A spring, U, carries it back into gear whenever the lever is released.

I am aware that cultivators have been made adjustable by means of beams pivoted to a slotted beam, as shown in patents to E. Underwood, May 7, 1871, and M. Shackleford, February 2, 1869; but this is not my invention.

Having thus described my invention, what I claim as new, and desire to secure by Letters Patent, is—

1. The hinged adjustable frame, with the mortised bar F and V-shaped sets of teeth supporting beams G, adjustable to or from each other upon rod C, so that the teeth K will serve as cultivators, or to mark the ground for and cover the seed, substantially as herein described.

2. The rotating and adjustable shaft P, with its radiating arms O, in combination with the slides N and spring Q of a seed-dropping apparatus, substantially as herein described.

3. The combination, in a planter and cultivator, as described, of the shaft P, having end motion in its boxes, and operating lever T, for the purpose of throwing the arms O and the pinion R out of gear simultaneously, together with the returning-spring U, substantially as described.

4. An interchangeable seed-sowing and cultivating device, consisting of the hinged and adjustable tooth-bearing frame, in combination with the seed-dropping device M N and the shaft P, with its radial arms O, to determine the spaces for dropping seed, substantially as herein described.

CHARLES FERDINAND KELLER. [L. S.]

Witnesses:
W. N. GLADDIN,
A. WRIGHT.